(No Model.)  4 Sheets—Sheet 1.

L. BUSH, Jr.
SAW SHARPENING MACHINE.

No. 297,566.  Patented Apr. 29, 1884.

Witnesses:
Jno. W. Stockett.
C. C. Poole

Inventor:
Lewis Bush Jr.
per M. V. Drayton
Attorney (No Model.) 4 Sheets—Sheet 2.

L. BUSH, Jr.
SAW SHARPENING MACHINE.

No. 297,566. Patented Apr. 29, 1884.

Witnesses:
Jno. H. Stockett.
C. C. Poole

Inventor:
Lewis Bush Jr
per M. S. Denison
Attorney

N. PETERS, Photo-Lithographer, Washington, D. C.

(No Model.) 4 Sheets—Sheet 3.

L. BUSH, Jr.
SAW SHARPENING MACHINE.

No. 297,566. Patented Apr. 29, 1884.

Witnesses:
Jno. W. Stockett
C. C. Poole

Inventor
Lewis Bush Jr.
per M. E. Dayton
Attorney

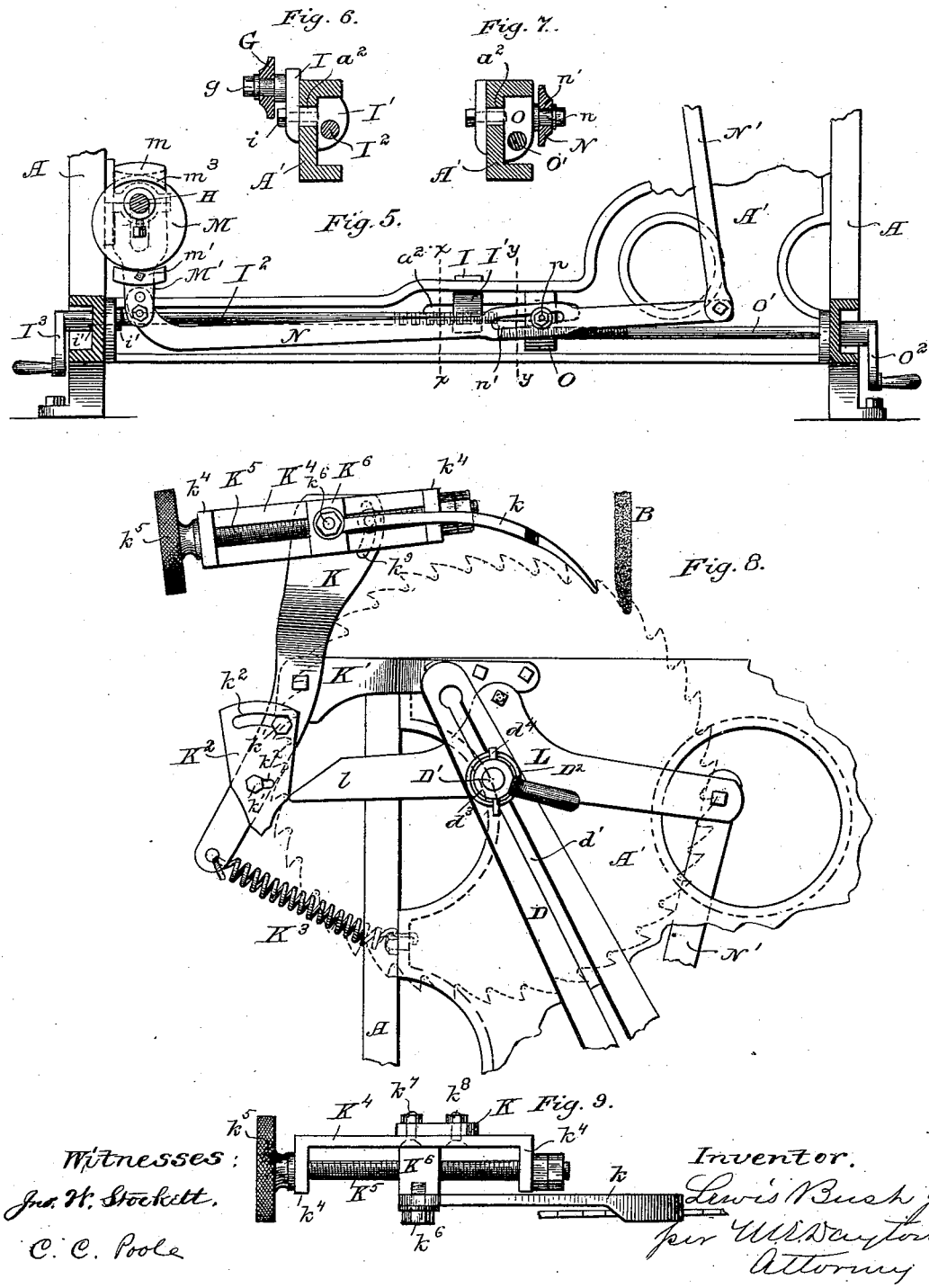

UNITED STATES PATENT OFFICE.

LEWIS BUSH, JR., OF CHICAGO, ILLINOIS, ASSIGNOR TO THE AMERICAN MACHINERY COMPANY, OF SAME PLACE.

SAW-SHARPENING MACHINE.

SPECIFICATION forming part of Letters Patent No. 297,566, dated April 29, 1884.

Application filed June 1, 1883. (No model.)

*To all whom it may concern:*

Be it known that I, LEWIS BUSH, Jr., of Chicago, in the county of Cook and State of Illinois, have invented certain new and useful Improvements in Saw-Sharpening Machines; and I do hereby declare that the following is a full, clear, and exact description thereof, reference being had to the accompanying drawings, and to the letters of reference marked thereon, which form a part of this specification.

This invention relates to an improvement in machines for sharpening saws.

It relates more particularly to that class of sharpeners in which the grinding-disk is mounted upon an arbor having stationary bearings, and in which the saw is reciprocated in order to bring its teeth into contact with the said disk.

The object of the invention is to provide an improved construction in the class of machines above mentioned; and it consists in the matters hereinafter described, and pointed out in the claims.

Figure 1:
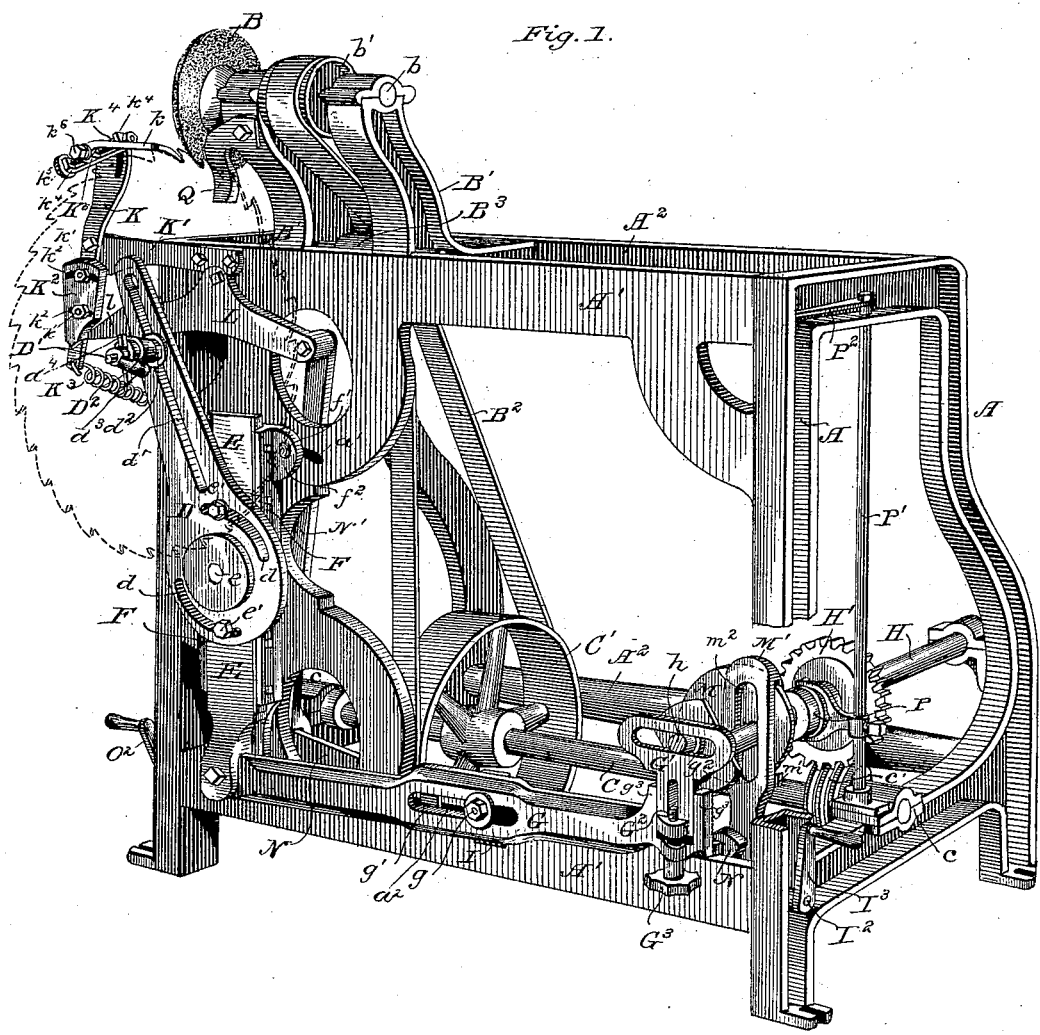
Figure 2:
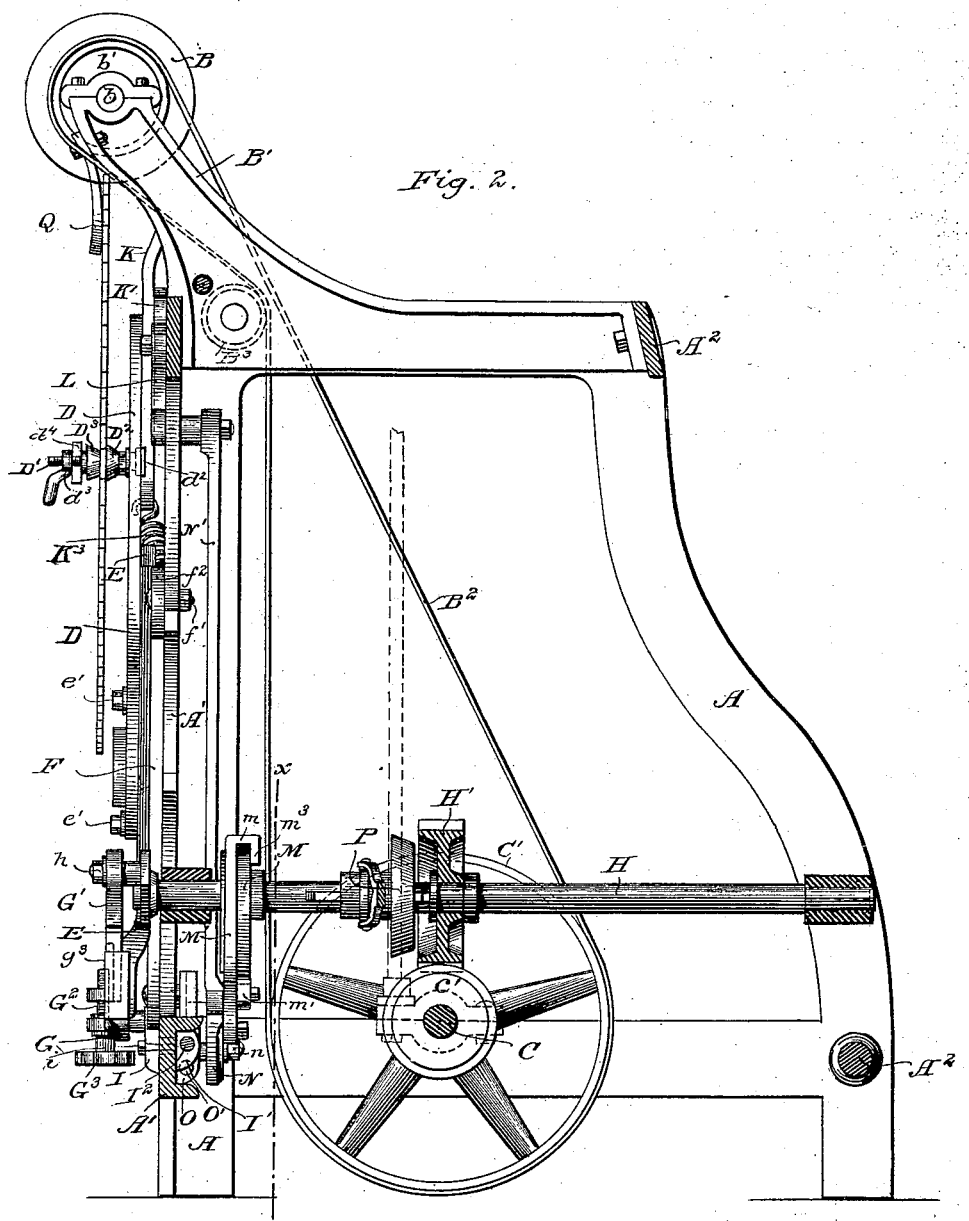
Figure 3:
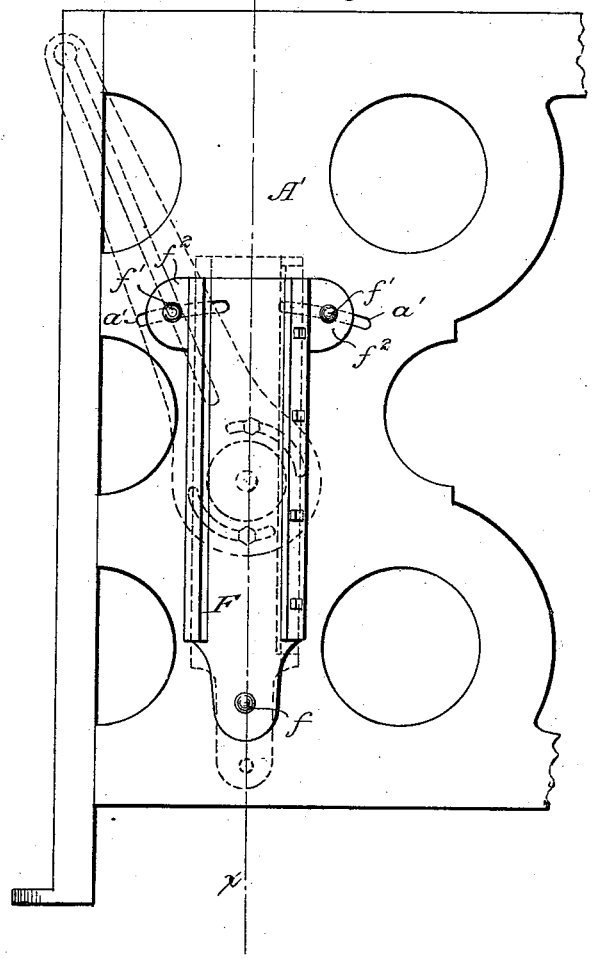
Figure 4:
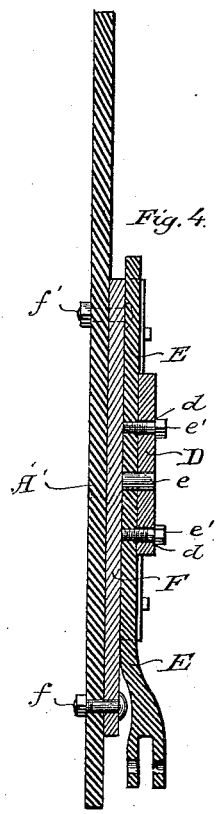
Figure 10:
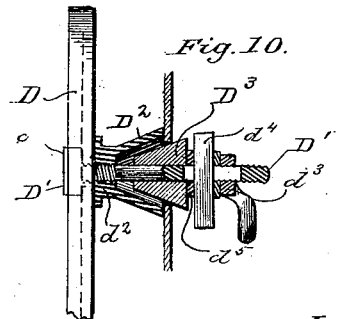

In the accompanying drawings, Figure 1 is a perspective view of a machine embodying my invention. Fig. 2 is a vertical cross-section taken upon a line parallel to the end frame of the machine and through the transverse shaft, by which the several parts for moving the saw are operated. Fig. 3 is a detail view of a portion of the machine-frame and the adjustable guide for supporting the slide to which the saw is attached. Fig. 4 is a vertical section on line $x\,x$ of Fig. 3. Fig. 5 is a detail section on line $x\,x$ of Fig. 2, looking toward the left. Fig. 6 is a transverse section on line $x\,x$ of Fig. 5. Fig. 7 is a transverse section on line $y\,y$ of Fig. 5. Fig. 8 is a detail view of the feed devices for rotating the saw. Fig. 9 is a detail plan of the devices for adjusting the feed-finger. Fig. 10 is a detail section of the supporting-pin for the saw.

The main frame of the machine, upon which the several operative parts are supported, consists, as shown in the drawings, of two end castings, A, a connecting front plate, A', and girts $A^2$ at the rear.

B is a grinding-disk, which is mounted upon an arbor, $b$, supported in suitable bearings upon standards B', secured to the top of the machine-frame. The said arbor is provided with a driving-pulley, $b'$, and motion is given to it through the medium of a belt, $B^2$, which passes over a pulley, C', placed upon a main driving-shaft, C. The said driving-shaft is arranged longitudinally of the machine at the lower part of the frame, and has bearings in boxes $c$, supported upon the end castings, A. A loose pulley, $B^3$, is placed between the standards B' at a point opposite the upper edge of the plate A', so as to prevent the contact of the said belt with the edge of the plate.

The saw to be sharpened is held by means of a center pin, D', upon an arm, D, which is pivotally attached at its lower end to a sliding plate, E. The said sliding plate is held upon an adjustable guide-plate, F, secured to the front frame-plate, A', and is reciprocated vertically, for the purpose of presenting the saw-teeth in succession to the grinding-disk, by means of a centrally-pivoted lever, G, which is connected at one end to the lower extremity of said plate and at the other to a crank upon a rotating shaft, H. The said shaft H is arranged transversely to the main driving-shaft C, and is actuated therefrom by means of a worm-gear, $c'$, and a spur-wheel, H', placed, respectively, upon said shafts C and H.

The arm D, to which the saw is attached, is placed upon a pivot-pin, $e$, secured in the plate E, (as shown more plainly in Fig. 4,) and the said arm is adjustably held upon said plate by means of two bolts, $e'$, which are tapped into said plate and pass through two curved slots, $d$, in the arm D, so that the said arm can be set at any angle desired and firmly secured when so placed. The pin D', upon which the saw is held, passes through a slot, $d'$, in the arm D, and is adjustably held in place upon said arm by a nut, $d^2$. By means of the rotary adjustment of the arm D upon the plate E, and the longitudinal adjustment of the pin D' upon said arm, as described, the said pin may be placed nearer to or farther from the grinding-disk, and provision is made thereby for placing saws of different diameters upon the machine.

In the machine shown, the slide E and guide-plate F are so arranged that the saw in the reciprocation of said slide E is advanced to the grinding-disk in a direction parallel with the line of the advance edges of the teeth, which edges are ground during such movement of the saw. In order to vary the inclination of said advance edges when it is desired to change the general form of the teeth, the guide-plate F is pivoted at its lower end to the frame-plate A', by means of a bolt, $f$, and is adjustably secured at its upper end to said plate by means of bolts $f'$, passing through ears $f^2$ upon said plate, and through curved slots $a'$ in the plate A', thus permitting a rotary adjustment of the said guide-plate upon its pivotal point. By such adjustment the direction in which the plate E is moved when vibrated may be changed, and the saw advanced to the grinding-disk at any desired angle. The pivotal point of the guide-plate F is preferably placed at a point about opposite the pivoted connection between the slide E and the lever G, as shown in Figs. 3 and 4, so that the position of the lower end of the slide will not be changed materially when the said guide-plate is adjusted, as above described. The lever G is pivoted to the frame A' by means of a pivot-pin, $g$, which passes through a longitudinal slot, $g'$, formed in the central portion of said lever, and is connected to a crank-pin, $h$, upon the end of the driving-shaft H, by means of a horizontal slot, $g^2$, formed in the end of said lever. The slotted connections described permit a longitudinal movement in the said lever G, so that it may adjust itself both to the reciprocatory movement of the slide E and to the change in the position and direction of movement of said slide when the guide-plate F is adjusted in the manner set forth. The slot $g'$ also permits a horizontal movement of the pivot-pin $g$ in the lever G', said pin being made adjustable upon the machine-frame and in the said slot for the purpose of varying the relative movements of the ends of said lever, as will be hereinafter more fully described.

In order to provide means for adjusting the end of the lever G vertically with reference to the crank-pin $h$, so that the limit of the upward-and-downward movement of the saw may be controlled accurately with reference to the edge of the grinding-disk, the slot $g^2$ is formed in a separate plate, G', which extends upwardly from said arm and is adjustably attached thereto. As preferably constructed, the plate G' is placed in transverse guides $g^3$ upon the lever G, and is held in position and adjusted by means of a screw-shaft, $G^2$, passing through a lug on said plate, and a corresponding lug upon the end of the said lever. The said shaft $G^2$ is provided with a hand-wheel, $G^3$, by which it may be turned, as shown. By the adjustment of the plate G' described, the saw, while being reciprocated through a distance necessary to give the size of the tooth required, may be moved upward to the grinding-disk as it is ground away until the necessary amount of material has been removed to bring the teeth to the required shape, or to sharpen them sufficiently. The pivot-pin $g$ of the lever G is made adjustable upon the machine-frame, as before mentioned, for the purpose of changing the relative lengths of the arms of said lever, and thereby varying the amplitude of the oscillations of the end thereof, which is attached to the plate E, so that the amount of movement given to the saw, as it is reciprocated, may be varied as desired, and as may be found necessary in operating upon teeth of different sizes. As a preferable means of supporting and adjusting the pin $g$, it is secured in a block, I, Fig. 6, placed upon the outside face of the plate A', said block being connected to a sliding block, I', upon the inside thereof by means of a stud, $i$, passing through a horizontal slot, $a^2$, in said plate. The block I' is provided with a screw-threaded aperture, through which passes a longitudinally-stationary screw-shaft, $I^2$, which is arranged at the rear of the said plate, and has a bearing at one end in the frame-casting A of the machine. The shaft $I^2$ extends beyond the said casting, and is provided upon its end with a crank, $I^3$, by which it may be rotated, said shaft being provided at either side of its bearing in the end piece, A, with collars $i'$, by which any longitudinal movement thereof is prevented. By rotating the shaft $I^2$, the block I will be moved horizontally upon the frame, and the pin $g$ may be thereby adjusted as desired. An important advantage gained by this construction is that the pin $g$, which forms the fulcrum of the lever, may be adjusted so as to vary the motion of the saw without stopping the machine or otherwise interfering with its operation.

For the purpose of producing the necessary rotary feed movement of the saw, a loosely-hung feed-finger, $k$, is attached to the upper end of a lever, K, pivoted to an arm, K', upon the machine-frame. The free end of the said finger rests upon the periphery of the saw, and the said lever K is oscillated so as to give a reciprocating movement to the said finger, so that the said free end thereof will catch in the depressions between the teeth, and feed them forward, one tooth at a time, to the grinding-disk. For the purpose of oscillating the lever K a lever, L, is pivoted to the plate A', the end of one arm, $l$, of which lever is provided with a narrow bearing-edge, which rests transversely upon the edge of a form-block, $K^2$, secured to the lower arm of said lever K. The said block $K^2$ is kept in contact with the end of the lever L by means of a spring, $K^3$, secured at one of its ends to the lower extremity of said lever K, and at its other end to the machine-frame. The lever L is actuated from an eccentric, M, upon the shaft H by means of a lever, N, pivoted at a point between its ends upon a pin, $n$, attached to the machine-frame, and connected at one end to said eccentric, and at its opposite end to the said lever L by means of a pitman, N'.

In the operation of sharpening the saws in the machine described, as in other saw-sharpeners, the tooth is ground on both edges, the advance edge being operated upon during the approach of the saw to the grinding-disk, and the back edge during the receding movement and while the saw is being rotated by the feeding device. The shape of the back of the tooth is therefore determined by the relative movements of the feed-finger and the devices for reciprocating the saw. The said reciprocating motion is constant in the present machine, and the form of the back of the tooth is determined therein by the motion given to the feed-finger by the action of the lever L upon the form-block $K^2$. The outline of said block $K^2$ is made of such shape as to give the general form of tooth desired, said shape being determined by experiment, and in order to adapt such block to teeth of varying sizes and angles, it is adjustably attached to the lever K, the connecting devices, as shown, consisting of bolts $k'$, passing through apertures in said lever, and through curved slots $k^2$ in the said block. The opposite edges of the block $K^2$ are preferably formed with outlines constructed to produce teeth of different curvature, and said blocks may be reversed, as shown, so that two different forms of teeth may be made upon the machine without other change. In order to permit the shape of the block $K^2$ to be readily changed, said block is preferably constructed of hard wood, it having been found in practice that such material is sufficiently durable for the purpose. By so constructing the said block, it may be readily renewed when desired, or a new block shaped to produce any form of tooth desired may be substituted.

The lever L is preferably pivoted to the machine-frame at a point considerably above the point of contact of its end $l$ with the form-block $K^2$, as shown. By this construction, the said end of the lever L acts against the form-block $K^2$ at an angle—that is, the said end has a horizontal as well as a vertical movement, and the motion given to the lever K is thus caused partially by said horizontal movement of the end of the lever and partially by the form of the block $K^2$. A greater power is thus exerted by the lever L upon the form-block, and less friction caused by the passage of the end of the lever over the edge of the block than if the said end had a vertical movement only and the motion given entirely by the form of the block. Aside from these advantages, it is found that by the construction described a less change in the shape or position of the form-block will cause a greater variation in the form of the teeth than when otherwise constructed.

The feed-finger $k$ is adjustably connected to the upper end of the lever K in the following manner: A plate, $K^4$, is secured transversely upon the end of the lever K, Fig. 9, said plate being provided with a screw-shaft, $K^5$, having bearings at either end in lugs $k^4$ upon its ends. The screw-shaft $K^5$ is provided with a milled head, $k^5$, and passes through a block, $K^6$, which is constructed to slide upon the face of the plate $K^4$ between the lugs $k^4$. The feed-finger $k$ is pivoted to the block $K^6$ by means of a stud, $k^6$. By turning the screw-head $k^5$, and thereby moving the block $K^6$, the free end of the said feed-finger may be adjusted according to the size of the saw-teeth and the position of the saw. The said finger is pivoted loosely to the block $K^6$, so that its free end may fall by gravity into the depressions between the teeth when said finger is reciprocated in the operation of the machine. The plate $K^4$ is connected to the lever K by means of a pivot-bolt, $k^7$, Fig. 9, and a clamp-bolt, $k^8$, which latter bolt passes through said plate and a curved slot, $k^9$, in said arm, whereby the angle that the said plate bears to said arm may be adjusted as desired. The object of this adjustment of the plate $K^4$ upon the lever K is to permit the angle at which the feed-finger intersects the periphery of the saw to be varied in operating upon teeth of different shape.

As a preferred means of operating the lever N from the eccentric M, a plate, M', Fig. 5, is pivoted to the said lever, said plate being arranged in a vertical position near one face of said eccentric, and provided with two lateral projections, $m$ and $m'$, constructed to engage the periphery of the eccentric at its top and bottom. The said plate M' is provided with a vertical slot, $m^2$, Fig. 1, through which the shaft H passes, so as to retain said plate in a vertical position. The projection $m$ at the top of the plate M' has a depending flange, $m^3$, which embraces the edge of the cam, so as to prevent any lateral displacement of said plate.

The lever N is preferably provided with an upturned end at its point of connection with the plate M', as shown, and two or more apertures are formed in said end, in either of which apertures the pivot-pin connecting it with said plate may be placed, and the distance between the said end of the lever and the eccentric thereby changed in adjusting the machine.

For the purpose of changing the relative lengths of the ends of the lever N, the pivot-pin $n$ of said lever is made adjustable upon the frame-plate A', a slot, $n'$, being formed in said lever, so as to permit the movement of said pivot in adjusting it. The pin $n$ is secured in a block, O, constructed to slide upon the frame-plate A', and moved by a screw-shaft, O', which is operated by a crank, O², in the manner before described in connection with the sliding block I, as shown in Figs. 5 and 7.

In order to prevent any rotation of the saw upon the supporting-pin D', except by the action of the feed mechanism, a friction device is provided for securing the saw upon the said pin, which is preferably constructed as follows: The nut $d^2$, by which the pin D′ is held upon the arm D, as before described, is connected to the apex of a hollow cone, $D^2$, Fig. 10, preferably made integral with said nut, as shown. The said pin D′ is made smooth in its central portion, and upon it is placed a cone, $D^3$, with its apex directed toward the interior of the hollow cone $D^2$. A nut, $d^3$, is placed upon the screw-threaded end portion of the pin D′, and constructed to bear against the base of the cone $D^3$, so that said cone may be forced against the edges of the orifice in the saw when it is placed over the pin D′, and the saw thereby centered upon the said pin, and at the same time pressed against the edges of the hollow cone $D^2$. The cone $D^3$ is constructed to rotate freely upon the pin D′, so that it will turn with the saw as the latter is rotated. The contact of the face of the saw with the edge of the stationary hollow cone $D^2$ causes sufficient friction to retain the saw in any position in which it may be placed, and by tightening or loosening the nut $d^3$ such friction can be increased or diminished, as desired. In order to prevent the nut $d^3$ from being rotated by the turning of the cone $D^3$, the pin D′ is slotted, as shown, and a key, $d^4$, is passed through said slot with its ends between the cone and the nut, a washer, $d^5$, being preferably placed between the said key and the base of the cone, so as to afford an annular bearing-surface for said base.

In devices previously used in sharpening-machines for securing the saw thereon, a stationary solid cone has been used, upon which the saw is held by means of a movable hollow cone. This construction presents the disadvantage that saws having central apertures of different diameters will assume different lateral positions when placed upon such stationary cone, and also that in the rotation of the saw upon such cone, the surface thereof will be cut or worn by the action of the edges of the orifice in the saw, so as to cause irregularity in the shape of the cone. By the improved construction above set forth, both of the objections stated are entirely obviated, the saws being held at an equal distance from the arm D by the hollow cone $D^2$, and any wear upon the cone $D^3$ prevented by its being allowed to rotate with the saw placed thereon, as before described.

The edge of the saw near the grinding-disk is supported and held in the proper position by means of a guide, Q, which is bolted to the machine-frame, as shown. Two of these guides may be used—one upon each side of the saw—and they may be arranged in any desired or preferred manner.

The wheel H′, by which the shaft H is rotated, is preferably mounted loosely on said shaft, and connected thereto by means of a friction-clutch, P, whereby the operation of the parts for moving the saw may be stopped without arresting the motion of the main driving-shaft C. The said clutch is preferably operated by means of a vertical rod, P′, which extends upwardly to the top of the machine, and is provided with a lever, $P^2$, having connection with a sliding rod extending to the opposite end of the machine and terminating with a suitable handle, so that the clutch may be conveniently moved by an operator standing near the end of the machine at which the saw is placed.

I am aware that in saw-sharpening machines as heretofore constructed a reciprocating sliding plate constructed to support the saw has been held in guides secured to the machine-frame, and that such sliding plate has been made vertically adjustable with reference to the part by which it is moved, and the guides for said plate have been made laterally adjustable with reference to the machine-frame, the adjustments mentioned being for the purpose of permitting the saw to be moved with reference to the grinding-disk. This construction is objectionable for various reasons, one being that the amount of adjustability is necessarily limited unless the entire machine is made of inconvenient size. My invention is therefore not intended to cover a device similar to that above described, but is confined to a construction in which the saw has both a lateral and vertical or universal adjustment with reference to the sliding plate—as, for instance, by means of the adjustable slotted arm D, as shown.

I claim as my invention—

1. In a saw-sharpening machine, the combination, with the machine-frame and with a rotary grinding-disk mounted in stationary bearings, of a guide-plate, F, adjustably attached to the machine-frame, a sliding plate, E, means for supporting the saw from the plate E, constructed to permit said saw to be adjusted both laterally and vertically with reference to said plate, and means for reciprocating said plate, substantially as described.

2. In a saw-sharpening machine, the combination, with the machine-frame and with a rotary grinding-disk mounted in stationary bearings, of a guide-plate, F, adjustably attached to the machine-frame, a sliding plate, E, arm D, for adjustably supporting the saw upon the plate E, and means for reciprocating the said plate E, substantially as described.

3. In a saw-sharpening machine, the combination, with a rotary grinding-disk and with a sliding plate, E, for supporting the saw, of a lever, G, pivoted to the machine-frame and connected at one end to said plate E, means for operating said lever, and a guide-plate, F, pivoted to the machine-frame at its lower end at a point near the connection between the plate E and lever G, and adjustably secured at its upper end to said frame, substantially as and for the purpose set forth.

4. In a saw-sharpening machine, the combination, with a rotary grinding-disk, with a sliding plate, E, and with means for reciprocating said plate, of an arm, D, connected at one end to said plate so as to permit a rotary adjustment of said arm upon said plate, a pin, D', upon said arm for supporting the saw, and means for adjusting said pin longitudinally upon said arm and securing it in its adjusted position, substantially as described.

5. In a saw-sharpening machine, the combination, with the grinding-disk B, and with the sliding plate E, provided with a pivot-pin, $e$, of an arm, D, provided with an aperture for the insertion of said pivot-pin, with curved slots $d$, and with a longitudinal slot, $d'$, bolts $e'$, for securing said arm to the said plate, a pin, D', for supporting the saw, and means for adjustably securing said pin in the said slot $d'$, substantially as described.

6. In a saw-sharpening machine, the combination, with a grinding-disk, B, and a sliding plate, E, for supporting the saw, of a lever, G, connected with said plate, a movable fulcrum for said lever upon the machine-frame, means for adjusting said fulcrum longitudinally of the lever, and means for operating said lever, substantially as and for the purpose set forth.

7. In a saw-sharpening machine, the combination, with a rotary grinding-disk, with a sliding plate, E, for supporting the saw, and with a crank-shaft, H, of a lever, G, provided with a longitudinal slot, $g'$, a sliding block, I', provided with a pivot-pin, $g$, and a screw-shaft, I$^2$, for moving said block, substantially as described.

8. The combination, with the sliding plate E, and the shaft H, provided with a crank-pin, $h$, of the lever G, and adjustable means for connecting said lever with the crank-pin, substantially as described.

9. The combination, with the sliding plate E, the shaft H, provided with a crank-pin, $h$, and with the lever G, of a plate, G', adjustably attached to said lever, and provided with a slot, $g^2$, substantially as and for the purpose set forth.

10. In a saw-sharpening machine, the combination, with a grinding-disk, and with means for supporting the saw, of a feed-finger, $k$, a pivoted lever, K, a form-block, K$^2$, adjustably attached to said lever, a lever, L, having its end constructed to bear against said form-block, means for oscillating the said lever L, and a spring, K$^3$, for retaining the said form-block in contact with the said lever, substantially as described.

11. In a saw-sharpening machine, the combination, with the feed-finger $k$, with the lever K, and with means for operating said lever, of the plate K$^4$, sliding block K$^6$, adjusting-screw K$^5$, and means for adjustably securing the said plate to the said lever, substantially as described.

12. The combination, with the feed-finger $k$, with the lever K, provided with the form-block K$^2$, with the lever L, and with the shaft H, provided with an eccentric, M, of the lever N, provided with a movable fulcrum, $n$, and a pitman, N', substantially as described.

13. In the saw-sharpening machine described, the combination, with the lever K, provided with a form-block, as K$^2$, of a lever, L, arranged to engage the form-block, and having its pivotal point located above its point of contact with the said block, substantially as and for the purpose set forth.

14. The combination, with the feed-finger lever K, of a form-block, K$^2$, constructed of wood, and removably attached to said lever, substantially as and for the purpose set forth.

15. In a saw-sharpening machine, the combination, with a pin, D', for supporting the saw, of a stationary hollow cone, D$^2$, a cone, D$^3$, constructed to rotate freely on said pin, and means for adjusting said cone D$^3$ longitudinally upon said pin and holding it in its adjusted posisition, substantially as described.

16. The combination, with the pin D', and with the hollow cone D$^2$, of the cone D$^3$, the nut $d^3$, and a key, $d^4$, constructed to pass through a slot in said pin, substantially as described.

In testimony that I claim the foregoing as my invention I affix my signature in presence of two witnesses.

LEWIS BUSH, JR.

Witnesses:
C. CLARENCE POOLE,
JESSE COX, JR.